(12) United States Patent
Huang

(10) Patent No.: US 8,971,324 B2
(45) Date of Patent: Mar. 3, 2015

(54) METHOD, DEVICE AND SYSTEM FOR IMPLEMENTING MULTICAST

(75) Inventor: Xiaofeng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 13/551,229

(22) Filed: Jul. 17, 2012

(65) Prior Publication Data

US 2012/0281697 A1 Nov. 8, 2012

(51) Int. Cl.
*H04L 12/28* (2006.01)
*H04L 12/18* (2006.01)
*H04L 12/761* (2013.01)

(52) U.S. Cl.
CPC ............ *H04L 12/1886* (2013.01); *H04L 45/16* (2013.01); *H04L 12/185* (2013.01)
USPC ......................................................... 370/390

(58) Field of Classification Search
CPC ..... H04L 12/185; H04L 49/00; H04L 49/201; H04L 49/351; H04L 29/06; H04L 63/162; H04L 69/167; H04L 12/18; H04L 61/2069; H04L 29/12915; H04L 65/4076; H04W 80/04; H04W 76/002; H04W 80/045; H04W 8/26; H04N 21/6405
See application file for complete search history.

(56) References Cited

U.S. PATENT DOCUMENTS

| | | |
|---|---|---|
| 2007/0107024 A1 | 5/2007 | Versteeg et al. |
| 2007/0217416 A1 | 9/2007 | Okuda |
| 2008/0068990 A1* | 3/2008 | Wu .............................. 370/229 |

FOREIGN PATENT DOCUMENTS

| | | | |
|---|---|---|---|
| CN | 1700676 | | 11/2005 |
| CN | 101060465 | | 10/2007 |
| CN | 101163002 | | 4/2008 |
| CN | 101163002 A | * | 4/2008 |
| CN | 101163093 A | | 4/2008 |
| CN | 101448003 A | | 6/2009 |
| CN | 101483655 | | 7/2009 |

OTHER PUBLICATIONS

S. E. Deering, "Host Extensions for IP Multicasting", Stanford University, RFC 988 Jul. 1986.*
PCT International Search Report mailed Mar. 31, 2011, issued in related International Application No. PCT/CN2010/074376, Huawei Technologies Co., Ltd. (4 pages).

(Continued)

*Primary Examiner* — Chi H Pham
*Assistant Examiner* — Raul Rivas
(74) *Attorney, Agent, or Firm* — Slater & Matsil, L.L.P.

(57) ABSTRACT

A method for implementing multicast includes: receiving or generating an internet group management protocol IGMP packet; judging whether the packet is a first join packet or a last leave packet of a multicast group, and adding an identifier indicating whether the IGMP packet is a first join packet or a last leave packet of a multicast group to the IGMP packet, where the identifier is used for a subsequent entity not to perform multicast processing on the IGMP packet when judging that the IGMP packet is not the first join packet or the last leave packet of the multicast group according to the identifier; and forwarding the IGMP packet to the subsequent entity. Therefore, the packet processing pressure on the network apparatus is relieved, and meanwhile, the IGMP packet requirements in the practical network are met.

17 Claims, 4 Drawing Sheets

S100. Receive or generate an IGMP packet

S110. Judge whether the IGMP packet is a first join packet or a last leave packet of a multicast group, and add an identifier indicating whether the IGMP packet is a first join packet or a last leave packet of a multicast group to the IGMP packet S110. Forward the IGMP packet

(56) References Cited

OTHER PUBLICATIONS

"The Research of Multicast Protocol in Link Layer Based on IGMP Snooping", IGMP Snooping, May 2005 (88 pages). Abstract.
Extended European Search Report received in Application No. 10853443.9—1862, Applicant: Huawei Technologies Co. Ltd., mailed Feb. 28, 2013, 8 pages.
Fenner, W., "IGMP-based Multicast Forwarding ("IGMP Proxying")," Internet Engineering Task Force, Jul. 11, 2000, 5 pages.

Written Opinion of the International Searching Authority received in International Application No. PCT/CN2010/074376, Applicant: Huawei Technologies Co., Ltd., et al., mailed Mar. 31, 2011, 5 pages.
Varshney, Upkar et al., "Architectural Issues to Support Multicasting over Wireless and Mobile Networks," Departement of Computer Information Systems, Georgia State University, 5 pages.
ZTE Corporation, "IPTV multicast requirement in Access Node," International Telecommunication Union, Focus Group on IPTV, FG IPTV-C-0876, Tokyo, Japan, Oct. 15-19, 2007, 2 pages.

\* cited by examiner

METHOD, DEVICE AND SYSTEM FOR IMPLEMENTING MULTICAST

CROSS-REFERENCE TO RELATED APPLICATIONS

This application is a continuation of International Application No. PCT/CN2010/074376, filed on Jun. 24, 2010, which is hereby incorporated by reference in its entirety.

FIELD OF THE INVENTION

The present invention relates to the field of network communication technologies, and in particular, to multicast technologies.

BACKGROUND OF THE INVENTION

A SNOOPING (snooping) or Multicast Listener Discovery Proxy (multicast listener discovery proxy, MLD proxy) technology is generally applied in the process of implementing multicast. When the SNOOPING technology is applied, other network apparatuses above a network apparatus that applies SNOOPING need to perform multicast processing on all received Internet Group Management Protocol (Internet Group Management Protocol, IGMP) packets (such as IGMP join packet and IGMP leave packet). Therefore, a high packet processing capability of the network apparatus is required. When the MLD proxy technology is applied, the MLD proxy terminates the IGMP packet of a User Equipment (user equipment), which does not meet the IGMP packet requirements imposed by the practical network. For example, in the network, statistics collection and analysis for a global user need to be performed according to an on-demand operation from the user equipment. For another example, a network service provider (NSP) needs to provide a transparent channel for an internet service provider (ISP) so that the ISP can obtain the IGMP packet from the user equipment.

SUMMARY OF THE INVENTION

Embodiments of the present invention provide a method, a device and a system for implementing multicast to relieve packet processing pressure on a network apparatus and meet the IGMP packet requirements in the practical network.

A method for implementing multicast provided by an embodiment of the present invention includes:

receiving or generating an interne group management protocol IGMP packet;

judging whether the IGMP packet is a first join packet or a last leave packet of a multicast group, and adding an identifier indicating whether the IGMP packet is a first join packet or a last leave packet of a multicast group to the IGMP packet, where the identifier is used for a subsequent entity not to perform multicast processing on the IGMP packet when judging that the IGMP packet is not the first join packet or the last leave packet of the multicast group according to the identifier; and forwarding the IGMP packet to the subsequent entity.

Another method for implementing multicast provided by an embodiment of the present invention includes:

receiving an internet group management protocol IGMP packet;

performing multicast processing on the IGMP packet when determining that the IGMP packet is a first join packet or a last leave packet of a multicast group according to an identifier in the IGMP packet, and forwarding the IGMP packet; and performing no multicast processing on the IGMP packet when determining that the IGMP packet is not the first join packet or the last leave packet of the multicast group according to the identifier in the IGMP packet, and forwarding the IGMP packet.

A device for implementing multicast provided by an embodiment of the present invention includes:

a first module, configured to receive or generate an internet group management protocol IGMP packet;

a distinguishing and identifier-adding module, configured to judge whether the IGMP packet is a first join packet or a last leave packet of a multicast group and add an identifier indicating whether the IGMP packet is a first join packet or a last leave packet of a multicast group to the IGMP packet, where the identifier is used for a subsequent entity not to perform multicast processing on the IGMP packet when judging that the IGMP packet is not the first join packet or the last leave packet of the multicast group according to the identifier; and a first sending module, configured to forward the IGMP packet to the subsequent entity.

Another device for implementing multicast provided by an embodiment of the present invention includes:

a receiving module, configured to receive an internet group management protocol IGMP packet;

a sorting module, configured to determine whether the IGMP packet is a first join packet or a last leave packet of a multicast group according to an identifier in the IGMP packet;

a processing module, configured to: perform multicast processing on the IGMP packet received by the receiving module when the sorting module determines that the IGMP packet is the first join packet or the last leave packet of the multicast group, and not perform the multicast processing on the IGMP packet received by the receiving module when the sorting module determines that the IGMP packet is not the first join packet or the last leave packet of the multicast group; and a second sending module, configured to forward the IGMP packet received by the receiving module.

A network apparatus provided by an embodiment of the present invention includes:

a first device, configured to: receive an internet group management protocol IGMP packet, and judge whether the IGMP packet is a first packet and add an identifier indicating whether the IGMP packet is a first join packet or a last leave packet of a multicast group to the IGMP packet, where the first packet includes a first join packet or a last leave packet of a multicast group, and the identifier is used for a subsequent entity not to perform multicast processing on the IGMP packet when judging that the IGMP packet is not the first packet according to the identifier; and forward the IGMP packet; and a second device, configured to: receive the IGMP packet forwarded by the first device; when determining that the IGMP packet is the first join packet or the last leave packet of the multicast group according to the identifier in the IGMP packet, perform multicast processing on the IGMP packet, and forward the IGMP packet; when determining that the IGMP packet is not the first join packet or the last leave packet of the multicast group according to the identifier in the IGMP packet, perform no multicast processing on the IGMP packet, and forward the IGMP packet.

A system for implementing multicast provided by an embodiment of the present invention includes a first network apparatus, a second network apparatus, and a final receiving apparatus, where the first network apparatus and the final receiving apparatus are connected through at least one level of the second network apparatus, the first network apparatus is configured to: receive or generate an IGMP packet, judge whether the IGMP packet is a first join packet or a last leave packet of a multicast group, add an identifier indicating whether the IGMP packet is a first join packet or a last leave packet of a multicast group to the IGMP packet, and forward the IGMP packet;

the second network apparatus is configured to: receive the IGMP packet sent by the first network apparatus or the upstream second network apparatus; when determining that the IGMP packet is the first join packet or the last leave packet of the multicast group according to the identifier in the IGMP packet, perform multicast processing on the IGMP packet, and forward the IGMP packet to a downstream node; when determining that the IGMP packet is not the first join packet or the last leave packet of the multicast group according to the identifier in the IGMP packet, perform no multicast processing on the IGMP packet, and forward the IGMP packet to the downstream node; and the final receiving apparatus is configured to receive and store the IGMP packet sent by a last level of the upstream second network apparatus.

It can be known from the technical solutions that, whether the IGMP packet is the first join packet or the last leave packet of the multicast group is judged and the identifier indicating whether the IGMP packet is the first join packet or the last leave packet of the multicast group is added to the IGMP packet, so that the current network apparatus or the downstream network apparatus can know whether it is required to perform multicast processing on the IGMP packet, avoiding a phenomenon that the current network apparatus or the downstream network apparatus performs multicast processing on all IGMP packets, and relieving the packet processing pressure on the network apparatus; the IGMP packet is forwarded, so that the final receiving apparatus can know the IGMP packet in the network, avoiding phenomenon that statistics collection and analysis for a global user cannot be performed for an on-demand operation of the user equipment and an NSP cannot provide a transparent channel to an ISP. Therefore, in this embodiment, the demands for the packet processing capacity of the network apparatus can be decreased, and meanwhile, the IGMP packet requirements in the practical network are met.

BRIEF DESCRIPTION OF THE DRAWINGS

To illustrate the technical solution of embodiments of the present invention or the prior art more clearly, the following outlines the accompanying drawings involved in description of the embodiments of the present invention or the prior art. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The specific implementation process of the present invention is described with reference to embodiments. Apparently, the embodiments in the following descriptions are merely a part of the embodiments of the present invention, rather than all the embodiments of the present invention. All other embodiments obtained by persons of ordinary skill in the art based on the embodiments of the present invention without creative efforts shall fall within the protection scope of the present invention.

Embodiment 1: Method for Implementing Multicast

Figure 1:
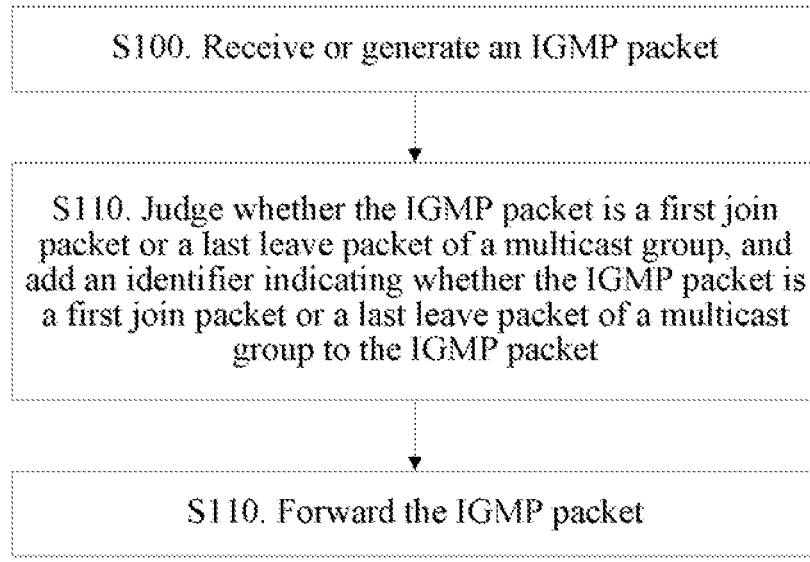
FIG. 1 is a flowchart of a method for implementing multicast according to Embodiment 1 of the present invention.

The entity that performs this embodiment may be an access apparatus or other network apparatuses. The access apparatus includes a Digital Subscriber Line Access Multiplexer (digital subscriber line access multiplexer, DSLAM), Optical Line Terminal (optical line terminal, OLT), and so on. The other network apparatuses include a switch, a router, a terminal apparatus, and so on. The terminal apparatus includes a MODEM (modem), a home gateway, a Set Top Box (set top box, STB), and so on. FIG. 1 is a flowchart of this method.

S100: Receive or generate an IGMP packet. If an executive body of this embodiment is a source end, such as an STB, of the IGMP packet, in S100, an IGMP packet is generated. If the executive body of this embodiment is a network apparatus above the source end of the IGMP packet, in S100, an IGMP packet transmitted from a host side is received.

S110: Distinguish whether the IGMP packet is a first join packet or a last leave packet of a multicast group and add an identifier indicating whether the IGMP packet is a first join packet or a last leave packet of a multicast group to the IGMP packet, that is, judge whether the IGMP packet is a first join packet or a last leave packet of a multicast group, and add an identifier indicating whether the IGMP packet is a first join packet or a last leave packet of a multicast group to the IGMP packet. The first join packet may specifically be a Report (report) packet in an IGMP version 2 or an MLD version 1, or may be a Report packet, indicative of joining a group, in an IGMP version 3 or an MLD version 2. The first leave packet may specifically be a Leave (leave) packet in the IGMP version 2 or the MLD version 1, or may be a leave packet, indicative of leaving a group, in the IGMP version 3 or the MLD version 2. This embodiment does not restrict a specific protocol applied to the first join packet and the last leave packet, and a specific name of the packet.

The adding the identifier indicating whether the IGMP packet is the first join packet or the last leave packet of the multicast group to the IGMP packet is a process for adding a distinguishing identifier to the IGMP packet to distinguish whether the IGMP packet is the first join packet or the last leave packet of the multicast group.

The process for adding the distinguishing identifier (the identifier may also be known as a distinguishing identifier) to the IGMP packet may be as follows: If the IGMP packet is the first join packet or the last leave packet of the multicast group, a special packet feature identifier is added to the IGMP packet; otherwise, no identifier is added to the IGMP packet.

The process for adding the distinguishing identifier to the IGMP packet may also be as follows: If the IGMP packet is not the first join packet nor the last leave packet of the multicast group (that is, the IGMP packet is neither the first join packet nor the last leave packet of the multicast group), a non-special packet feature identifier is added to the IGMP packet; otherwise, no identifier is added to the IGMP packet.

The process for adding the distinguishing identifier to the IGMP packet may also be as follows: If the IGMP packet is the first join packet or the last leave packet of the multicast group, a special packet feature identifier is added to the IGMP packet; otherwise, a non-special packet feature identifier is added to the IGMP packet.

A location in the IGMP packet of the distinguishing identifier added to the IGMP packet may be determined according to actual conditions of the network, that is, a field in the IGMP packet that imposes no impact on the network may be selected to carry the distinguishing identifier. For example, the distinguishing identifier may be included in a type field of an Ethernet encapsulation header of the IGMP packet, or in an option field of an IP packet header of the IGMP packet. This embodiment of the present invention does not restrict a specific location in the IGMP packet or a specific value of the distinguishing identifier.

The distinguishing identifier added to the IGMP packet is mainly used for a subsequent entity not to perform multicast processing when the subsequent entity judges that the IGMP packet is not the first join packet or the last leave packet of the multicast group according to the distinguishing identifier added to the IGMP packet, that is, the subsequent entity is notified whether the IGMP packet is the first join packet or the last leave packet of the multicast group, so that the subsequent entity can know whether it is required to perform the multicast processing on the IGMP packet. The multicast processing includes setting up a corresponding relationship between a port and the multicast group, or deleting the corresponding relationship between the port and the multicast group, or the like. The subsequent entity may be other boards such as a main control board in a local network apparatus, or other network apparatuses connected to the local network apparatus. This embodiment is not limited to a specific implementation manner of the multicast processing or a specific form of the subsequent entity.

S120: Forward the IGMP packet, that is, forward the IGMP packet to a downstream apparatus (that is, to the subsequent entity). The downstream apparatus may be other boards in current network apparatus, or other network apparatuses connected to the local network apparatus.

When the executive body of this embodiment is a network apparatus (for example, an access apparatus) above the source end of the IGMP packet, the IGMP packet forwarded by the network apparatus to the downstream network apparatus connected thereto may be the first join packet or the last leave packet of the multicast group directed to by a user equipment, or may be all join packets or all leave packets of the multicast group directed to by a user equipment. In some specific applications, the user equipment may not need to be directed to other join packets than the first join packet of the multicast group, or the user equipment may not need to be directed to other leave packets than the last leave packet of the multicast group. Therefore, the technical solution that the network apparatus forwards the first join packet or the last leave packet of the multicast group directed to by the user equipment to the downstream network apparatus connected thereto can satisfy the specific applications and reduce the number of IGMP packets transmitted in the network. The network apparatus can discriminate different user equipments according to address information (such as an MAC address) in the IGMP packet. This embodiment does not restrict a specific implementation manner for the network apparatus to identify whether the IGMP packet is a first join packet or a last leave packet of a multicast group directed to by the user equipment.

It can be known from Embodiment 1 that, in Embodiment 1, whether the IGMP packet is the first join packet or the last leave packet of the multicast group is distinguished and the identifier indicating whether the IGMP packet is the first join packet or the last leave packet of the multicast group is added to the IGMP packet, so that the current network apparatus or the downstream network apparatus can know whether it is required to perform multicast processing on the IGMP packet, avoiding a phenomenon that the current network apparatus or the downstream network apparatus performs multicast processing on all IGMP packets, and relieving the packet processing pressure on the network apparatus; the IGMP packet is forwarded, so that a final receiving apparatus can know the IGMP packet in the network, avoiding phenomenon that statistics collection and analysis for a global user cannot be performed for an on-demand operation of the user equipment and an NSP cannot provide a transparent channel to an ISP. Therefore, in this embodiment, the demands for the packet processing capacity of the network apparatus can be decreased, and meanwhile, the IGMP packet requirements in the practical network are met.

Embodiment 2: Method for Implementing Multicast

Figure 2:
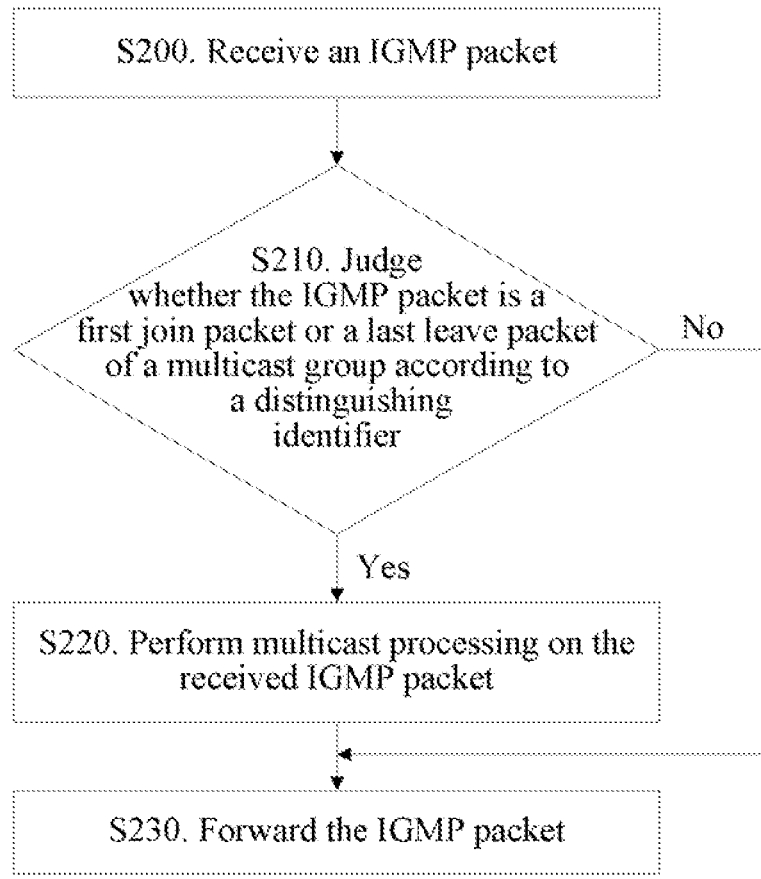
FIG. 2 is a flowchart of a method for implementing multicast according to Embodiment 2 of the present invention.

FIG. 2 is a flowchart of this method.

S200: Receive an IGMP packet.

S210: Judge whether the IGMP packet is a first join packet or a last leave packet of a multicast group according to a distinguishing identifier (that is, a distinguishing identifier) in the IGMP packet; when judging that IGMP packet is the first join packet or the last leave packet of the multicast group, proceed to S220; otherwise, proceed to S230.

The specific judgment process of S210 varies with different manners of adding the distinguishing identifier. In a specific example, when it is judged that the IGMP packet includes a special packet feature identifier, it is determined that the IGMP packet is the first join packet or the last leave packet of the multicast group; when it is judged that the IGMP packet includes no special packet feature identifier, it is determined that the IGMP packet is not the first join packet or the last leave packet of the multicast group. In another specific example, when it is judged that the IGMP packet includes a non-special packet feature identifier, it is determined that the IGMP packet is not the first join packet or the last leave packet of the multicast group; when it is judged that the IGMP packet includes no non-special packet feature identifier, it is determined that the IGMP packet is the first join packet or the last leave packet of the multicast group. In a third specific example, when it is judged that the IGMP packet includes a special packet feature identifier, it is determined that the IGMP packet is the first join packet or the last leave packet of the multicast group; when it is judged that the IGMP packet includes a non-special packet feature identifier, it is determined that the IGMP packet is not the first join packet or the last leave packet of the multicast group. This embodiment is not limited to a specific implementation manner for judging whether the IGMP packet is the first join packet or the last leave packet of the multicast group according to the distinguishing identifier.

S220: Perform multicast processing on the IGMP packet, and proceed to S230. The multicast processing includes setting up or deleting a corresponding relationship between a port and the multicast group. This embodiment of the present invention does not restrict a specific implementation manner of the multicast processing.

S230: Forward the IGMP packet.

Optionally, after judging whether the IGMP packet is the first join packet or the last leave packet of the multicast group in S210 and before forwarding the IGMP packet in S230, the method may also include: removing the distinguishing identifier in the IGMP packet, for example, a special packet feature identifier, or a non-special packet feature identifier. That is, the IGMP packet forwarded in S230 may include no distinguishing identifier.

An executive body of this embodiment may be an access apparatus or other network apparatuses. The access apparatus includes a DSLAM, an OLT, and so on. The other network apparatuses include a switch, a router, and so on.

It can be known from Embodiment 2 that, in Embodiment 2, whether the IGMP packet is the first join packet or the last leave packet of the multicast group can be identified according to the distinguishing identifier in the IGMP packet, so it can be known whether it is required to perform multicast processing on the IGMP packet, avoiding a phenomenon that the multicast processing is performed on all IGMP packets, and relieving the packet processing pressure on the network apparatus; the received IGMP packet is forwarded, so that a final receiving apparatus can know the IGMP packet in the network, avoiding phenomenon that statistics collection and analysis for a global user cannot be performed for an on-demand operation of the user equipment and an NSP cannot provide a transparent channel to an ISP. Therefore, in this embodiment, the demands for the packet processing capacity of the network apparatus can be decreased, and meanwhile, the IGMP packet requirements in the practical network are met.

Embodiment 3: Device for Implementing Multicast

Figure 3:
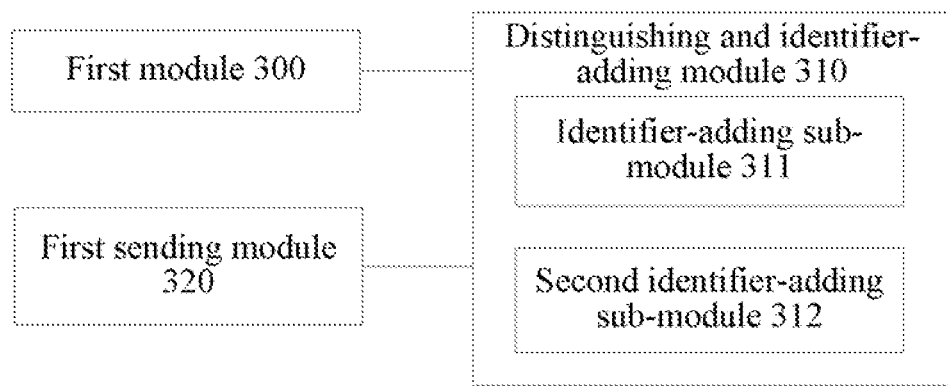
FIG. 3 is a schematic diagram of a device for implementing multicast according to Embodiment 3 of the present invention.

The device may be disposed in an access apparatus or other network apparatuses. The access apparatus includes a DSLAM, an OLT, and so on. The other network apparatuses include a switch, a router, and a terminal apparatus. FIG. 3 shows a structure of the device.

The device for implementing multicast in FIG. 3 includes a first module 300, a distinguishing and identifier-adding module 310, and a first sending module 320.

The first module 300 receives or generates an IGMP packet. The received IGMP packet is an IGMP packet transmitted a host side.

The distinguishing and identifier-adding module 310 is configured to judge whether the IGMP packet is a first join packet or a last leave packet of a multicast group and add an identifier indicating whether the IGMP packet is a first join packet or a last leave packet of a multicast group to the IGMP packet, that is, distinguish whether the IGMP packet output by the first module 300 is a first join packet or a last leave packet of a multicast group and add an identifier indicating whether the IGMP packet output by the first module 300 is a first join packet or a last leave packet of a multicast group to the IGMP packet. The first join packet may specifically be a Report packet in an IGMP version 2 or an MLD version 1, or may be a Report packet, indicative of joining a group, in an IGMP version 3 or an MLD version 2. The first leave packet may specifically be a Leave packet in the IGMP version 2 or the MLD version 1, or may be a leave packet, indicative of leaving a group, in the IGMP version 3 or the MLD version 2. This embodiment does not restrict a specific protocol applied to the first join packet and the last leave packet, and a specific name of the packet.

The distinguishing, by the distinguishing and identifier-adding module 310, whether the IGMP packet output by the first module 300 is the first join packet or the last leave packet of the multicast group and adding the identifier indicating whether the IGMP packet output by the first module 300 is the first join packet or the last leave packet of the multicast group is a process for the distinguishing and identifier-adding module 310 to add a distinguishing identifier to the IGMP packet, so as to discriminate whether the received IGMP packet is the first join packet or the last leave packet of the multicast group. The distinguishing and identifier-adding module 310 may add the distinguishing identifier to the IGMP packet in many ways. For example, if the IGMP packet is the first join packet or the last leave packet of the multicast group, the distinguishing and identifier-adding module 310 adds a special packet feature identifier to the IGMP packet; otherwise, the distinguishing and identifier-adding module 310 adds no identifier to the IGMP packet. For another example, if the IGMP packet is not the first join packet or the last leave packet of the multicast group, the distinguishing and identifier-adding module 310 adds a non-special packet feature identifier to the IGMP packet; otherwise, the distinguishing and identifier-adding module 310 adds no identifier to the IGMP packet. For another example, if the IGMP packet is the first join packet or the last leave packet of the multicast group, the distinguishing and identifier-adding module 310 adds a special packet feature identifier to the IGMP packet; otherwise, the distinguishing and identifier-adding module 310 adds a non-special packet feature identifier to the IGMP packet.

The distinguishing and identifier-adding module 310 may include any one or two of a first identifier-adding sub-module 311 and/or a second identifier-adding sub-module 312.

The first identifier-adding sub-module 311 is configured to add a special packet feature identifier to the IGMP packet when determining that the IGMP packet output by the first module 300 is the first join packet or the last leave packet of the multicast group.

The second identifier-adding sub-module 312 is configured to add a non-special packet feature identifier to the IGMP packet when determining that the IGMP packet output by the first module 300 is not the first join packet or the last leave packet of the multicast group.

A location in the IGMP packet of the distinguishing identifier added by the distinguishing and identifier-adding module 310, the first identifier-adding sub-module 311, or the second identifier-adding sub-module 312 to the IGMP packet may be determined according to actual conditions of the network, that is, a field in the IGMP packet that imposes no impact on the network may be selected to carry the distinguishing identifier. For example, the distinguishing and identifier-adding module 310, the first identifier-adding sub-module 311, or the second identifier-adding sub-module 312 makes the distinguishing identifier included in a type field of an Ethernet encapsulation header of the IGMP packet, or in an option field of an IP packet header of the IGMP packet. This embodiment does not restrict a specific location in the IGMP packet or a specific value of the distinguishing identifier added by the distinguishing and identifier-adding module 310, the first identifier-adding sub-module 311, or the second identifier-adding sub-module 312 to the IGMP packet.

The distinguishing identifier added by the distinguishing and identifier-adding module 310, the first identifier-adding sub-module 311, or the second identifier-adding sub-module 312 to the IGMP packet is mainly used for a subsequent entity not to perform multicast processing on the IGMP packet when the subsequent entity judges that the IGMP packet is not the first join packet or the last leave packet of the multicast group according to the identifier, that is, the distinguishing identifier is used to notify the subsequent entity whether the IGMP packet is the first join packet or the last leave packet of the multicast group, so that the subsequent entity can know whether it is required to perform multicast processing on the IGMP packet. The multicast processing includes setting up a corresponding relationship between a port and the multicast group or deleting the corresponding relationship between the port and the multicast group, or other operations. The subsequent entity may be other boards, such as a main control board, in the network apparatus that includes the device for implementing multicast in this embodiment, or other network apparatuses connected to the network apparatus that includes the device for implementing multicast in this embodiment. This embodiment does not restrict a specific implementation manner of the multicast processing or a specific form of the subsequent entity.

The first sending module 320 is configured to forward the IGMP packet processed by the distinguishing and identifier-adding module 310. That is, the first sending module 310 forwards the IGMP packet to a downstream apparatus. The downstream apparatus may be other boards in the network apparatus that includes the device for implementing multicast in this embodiment, or other network apparatuses (that is, downstream network apparatuses) connected to the network apparatus that includes the device for implementing multicast in this embodiment.

When the device for implementing multicast of this embodiment is disposed in a network apparatus (such as an access apparatus) above a source end of the IGMP packet, the IGMP packet forwarded by the first sending module 310 to a downstream network apparatus may be the first join packet or the last leave packet of the multicast group directed to by a user equipment, or may be all join packets or all leave packets of the multicast group directed to by a user equipment. In some specific applications, the user equipment may not need to be directed to other join packets than the first join packet of the multicast group, or the user equipment may not need to be directed to other leave packets than the last leave packet of the multicast group. Therefore, the technical solution that the first sending module 310 forwards the first join packet or the last leave packet of the multicast group directed to by the user equipment to the downstream network apparatus can satisfy the specific applications and reduce the number of IGMP packets transmitted in the network. The first sending module 310 can discriminate different user equipments according to address information (for example, an MAC address) in the IGMP packet. This embodiment does not restrict a specific implementation manner for the first sending module 310 to identify whether the IGMP packet is a first join packet or a last leave packet of a multicast group directed to by the user equipment.

It can be known from Embodiment 3 that, in Embodiment 3, the distinguishing and identifier-adding module 310 distinguishes whether the IGMP packet is the first join packet or the last leave packet of the multicast group and adds the identifier indicating whether the IGMP packet is the first join packet or the last leave packet of the multicast group, so that the network apparatus including the device for implementing multicast or the downstream network apparatus can know whether it is required to perform multicast processing on the IGMP packet, avoiding a phenomenon that the network apparatus including the device for implementing multicast or the downstream network apparatus performs multicast processing on all IGMP packets, and relieving the packet processing pressure on the network apparatus; first sending module 310 forwards the IGMP packet received by the first module 300, so that a final receiving apparatus can know the IGMP packet in the network, avoiding phenomenon that statistics collection and analysis for a global user cannot be performed for an on-demand operation of the user equipment and an NSP cannot provide a transparent channel to an ISP. Therefore, in this embodiment, the demands for the packet processing capacity of the network apparatus can be decreased, and meanwhile, the IGMP packet requirements in the practical network are met.

Embodiment 4: Device for Implementing Multicast

Figure 4:
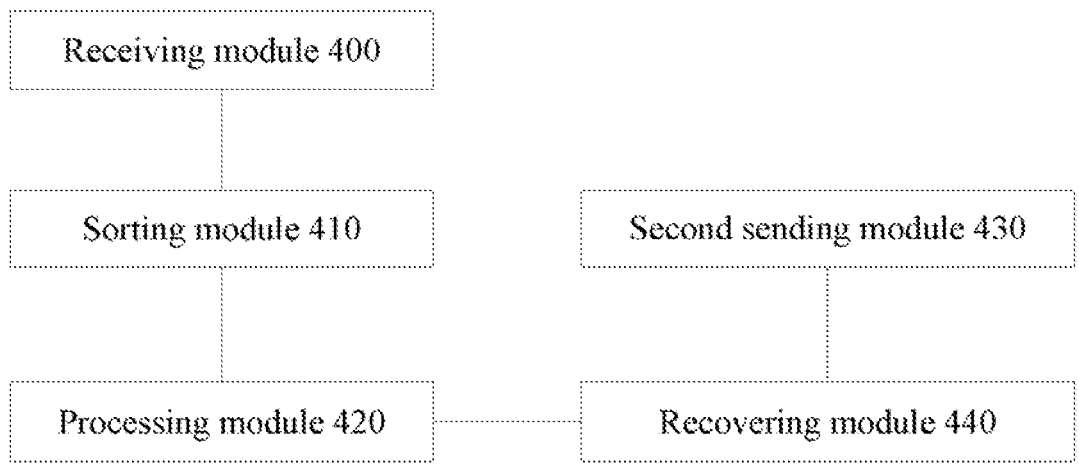
FIG. 4 is a schematic diagram of a device for implementing multicast according to Embodiment 4 of the present invention.

The device may be disposed in an access apparatus or other network apparatuses, and the access apparatus includes a DSLAM, an OLT, and so on. The other network apparatuses include a switch, a router, and so on. FIG. 4 shows a structure of the device.

The device for implementing multicast in FIG. 4 includes a receiving module 400, a sorting module 410, a processing module 420, and a second sending module 430. Optionally, the device may further include a recovering module 440.

The receiving module 400 is configured to receive an IGMP packet. The IGMP packet is an IGMP packet transmitted from a host side.

The sorting module 410 is configured to determine whether the IGMP packet is a first join packet or a last leave packet of a multicast group according to a distinguishing identifier in the IGMP packet received by the receiving module 400.

The specific judgment process of the sorting module 410 varies with different manners of adding the distinguishing identifier. In a specific example, when the sorting module 410 judges that the IGMP packet includes a special packet feature identifier, it is determined that the IGMP packet is the first join packet or the last leave packet of the multicast group; when the sorting module 410 judges that the IGMP packet includes no special packet feature identifier, it is determined that the IGMP packet is not the first join packet or the last leave packet of the multicast group. In another specific example, when the sorting module 410 judges that the IGMP packet includes a non-special packet feature identifier, it is determined that the IGMP packet is not the first join packet or the last leave packet of the multicast group; when the sorting module 410 judges that the IGMP packet includes no non-special packet feature identifier, it is determined that the IGMP packet is the first join packet or the last leave packet of the multicast group. In a third specific example, when the sorting module 410 judges that the IGMP packet includes a special packet feature identifier, it is determined that the IGMP packet is the first join packet or the last leave packet of the multicast group; when the sorting module 410 judges that the IGMP packet includes a non-special packet feature identifier, it is determined that the IGMP packet is not the first join packet or the last leave packet of the multicast group. This embodiment does not restrict a specific implementation manner for the sorting module 410 to judge whether the IGMP packet is the first join packet or the last leave packet of the multicast group according to the distinguishing identifier.

The processing module 420 is configured to perform multicast processing on the IGMP packet received by the receiving module 400 when the sorting module 410 determines that the IGMP packet received by the receiving module 400 is the first join packet or the last leave packet of the multicast group.

The processing module 420 does not perform the multicast processing on the IGMP packet received by the receiving module 400 when the sorting module 410 determines that the IGMP packet received by the receiving module 400 is not the first join packet or the last leave packet of the multicast group. The multicast processing performed by the processing module 420 includes setting up or deleting a corresponding relationship between the port and the multicast group. This embodiment does not restrict a specific implementation manner of the multicast processing performed by the processing module 420.

If the device in this embodiment does not include a recovering module 440, the second sending module 430 is configured to forward the IGMP packet received by the receiving module 400.

If the device in this embodiment includes a recovering module 440, the recovering module 440 is configured to remove the distinguishing identifier in the IGMP packet received by the receiving module 400. For example, the recovering module 440 removes the special packet feature identifier or the non-special packet feature identifier. The recovering module 440 transmits the IGMP packet exclusive of the distinguishing identifier to the second sending module 430. At this time, the second sending module 430 forwards the IGMP packet transmitted from the recovering module 440, that is, at this time, the IGMP packet forwarded by the second sending module 430 includes no distinguishing identifier.

It can be known from Embodiment 4 that, in Embodiment 4, the sorting module 410 identifies whether the IGMP packet is the first join packet or the last leave packet of the multicast group according to the distinguishing identifier in the IGMP packet, so that the processing module 420 can know whether it is required to perform multicast processing on the IGMP packet, avoiding a phenomenon that the processing module 420 performs multicast processing on all IGMP packets, and relieving the packet processing pressure on the network apparatus; the second sending module 430 forwards the IGMP packet received by the receiving module 400, so that a final receiving apparatus can know the IGMP packet in the network, avoiding phenomenon that statistics collection and analysis for a global user cannot be performed for an on-demand operation of the user equipment and an NSP cannot provide a transparent channel to an ISP. Therefore, in this embodiment, the demands for the packet processing capacity of the network apparatus can be decreased, and meanwhile, the IGMP packet requirements in the practical network are met.

Embodiment 5: Network Apparatus

The network apparatus may be an access apparatus or other network apparatuses. The access apparatus includes a DSLAM, an OLT, and so on. The other network apparatuses include a switch, a router, and so on. A structure of the network apparatus is shown in FIG. 5.

Figure 5:
FIG. 5 is a schematic diagram of a network apparatus according to Embodiment 5 of the present invention.

The network apparatus shown in FIG. 5 includes a first device 500 and a second device 510.

The first device 500 is configured to receive an IGMP packet, and judge whether the IGMP packet is a first join packet or a last leave packet of a multicast group, and add an identifier indicating whether the IGMP packet is a first join packet or a last leave packet of a multicast group to the IGMP packet, that is, the first device 500 distinguishes whether the IGMP packet is a first join packet or a last leave packet of a multicast group and adds an identifier indicating whether the IGMP packet is a first join packet or a last leave packet of a multicast group. The distinguishing identifier is used for a subsequent entity not to perform multicast processing on the IGMP packet when the subsequent entity judges that the IGMP packet is not the first join packet or the last leave packet of the multicast group according to the identifier, that is, the distinguishing identifier is used to notify the second device 510 whether to perform the multicast processing on the IGMP packet. The first device 500 forwards the distinguished and identifier-added IGMP packet to the second device 510. A structure of the first device 500 is as described in Embodiment 3 and will not be described here again.

Figure 5A:
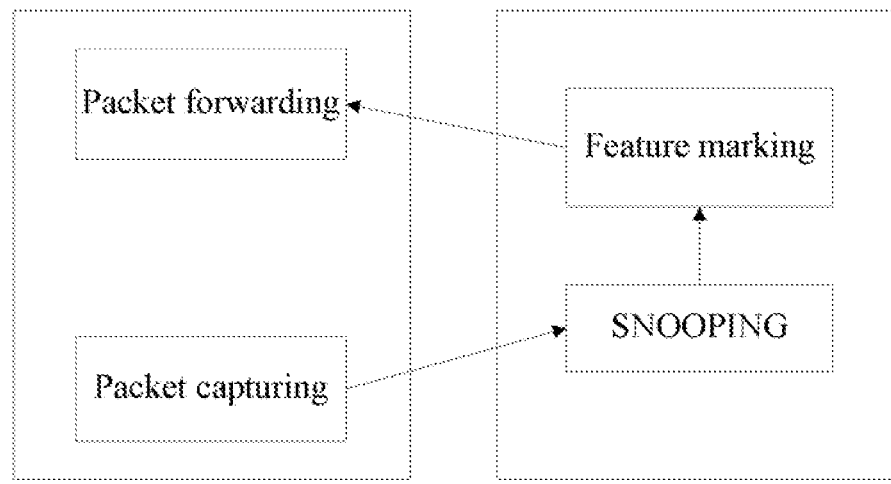
FIG. 5A is a schematic diagram of operations performed by a first device 500 according to Embodiment 5 of the present invention.

In the case that the network apparatus shown in Embodiment 5 is a network apparatus having a SNOOPING function, an instance of operations performed by the first device 500 is shown in FIG. 5A.

In FIG. 5A, the first device 500 captures a packet, and performs SNOOPING processing on the captured packet. The SNOOPING processing not only includes processing operations in the prior art, but also includes processing operations related to the present invention: judging whether the packet is a first join packet or a last leave packet of a multicast group. After judging that the packet is the first join packet or the last leave packet of the multicast group, the first device 500 performs feature marking processing on the packet. The feature marking process may include adding a special packet feature identifier to the packet. After judging that the packet is not the first join packet or the last leave packet of the multicast group, the first device 500 may add no feature identifier to the packet. Afterward, the first device 500 performs packet forwarding processing. If the packet is the first join packet or the last leave packet of the multicast group, the packet forwarding processing includes: sending, by the first device 500, the first join packet or the last leave packet, including a special packet feature identifier, of the multicast group to the downstream apparatus. If the packet is an IGMP packet but not the first join packet or the last leave packet of the multicast group, the packet forwarding processing includes: sending, by the first device 500, the packet including no feature identifier to the downstream apparatus.

The second device 510 is configured to: receive the IGMP packet forwarded by the first device; when determining that the IGMP packet is the first join packet or the last leave packet of the multicast group according to the distinguishing identifier in the IGMP packet, perform multicast processing on the IGMP packet, and forward the IGMP packet to the downstream apparatus; when determining that the IGMP packet is not the first join packet or the last leave packet of the multicast group according to the distinguishing identifier in the IGMP packet, perform no multicast processing on the IGMP packet, and forward the IGMP packet to the downstream apparatus. A structure of the second device 510 is as described in Embodiment 4 and will not be described here again.

Figure 5B:
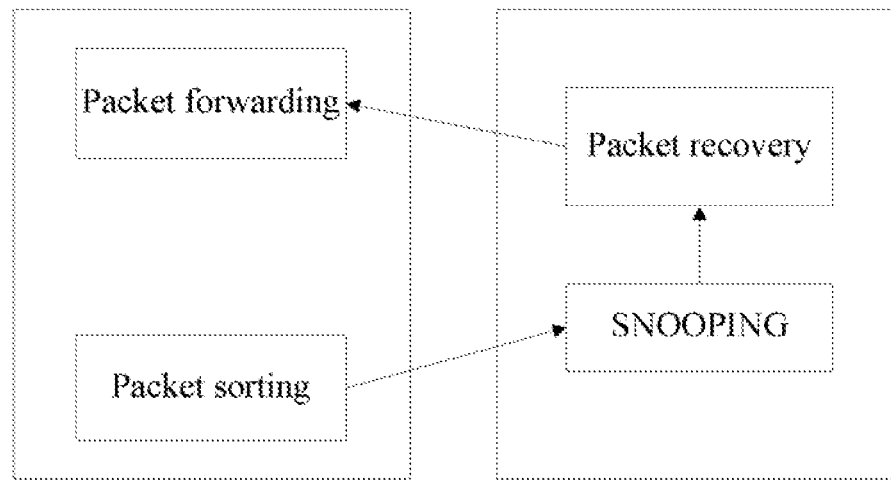
FIG. 5B is a schematic diagram of operations performed by a second device 510 according to Embodiment 5 of the present invention.

In the case that the network apparatus shown in Embodiment 5 is a network apparatus having a SNOOPING function, an instance of operations performed by the second device 510 is shown in FIG. 5B.

In FIG. 5B, the second device 510 performs packet sorting processing on the received packet. The packet sorting processing not only includes sorting operations in the prior art, but also includes operations related to the present invention: judging, by the second device 510, whether the received packet is an IGMP packet including a special packet feature identifier. After judging that the received packet is the IGMP packet including the special packet feature identifier, the second device 510 performs SNOOPING processing on the packet. The SNOOPING processing includes multicast processing. After judging that the received packet is an IGMP packet including no special packet feature identifier, the second device 510 may perform no SNOOPING processing on the packet. Afterward, the second device 510 performs feature recovery processing on the IGMP packet including the special packet feature identifier. The feature recovery processing refers to removing the special packet feature identifier from the first join packet or the last leave packet of the multicast group. Finally, the second device 510 performs packet forwarding processing. The packet forwarding processing may include: sending the IGMP packet exclusive of the special packet feature identifier to the downstream apparatus, or sending the IGMP packet which is not the first join packet or the last leave packet to the downstream apparatus.

In the description about FIG. 5A and FIG. 5B, it is assumed that the first device 500 and the second device 510 are disposed in the same network apparatus. Obviously, the first device 500 and the second device 510 may be disposed in different network apparatuses. In this case, the operations performed by the first device 500 and the second device 510 are still as described in the foregoing and will not be described here again.

It can be known from Embodiment 5 that, in Embodiment 5, the first device 500 distinguishes whether the IGMP packet is the first join packet or the last leave packet of the multicast group and adds the identifier indicating whether the IGMP packet is the first join packet or the last leave packet of the multicast group, so that the second device 510 can know whether it is required to perform multicast processing on the IGMP packet, avoiding a phenomenon that the second device 510 performs multicast processing on all IGMP packets, and relieving the packet processing pressure on the second device 510; the second device 510 forwards the IGMP packet, so that a final receiving apparatus can know the IGMP packet in the network, avoiding phenomenon that statistics collection and analysis for a global user cannot be performed for an on-demand operation of the user equipment and an NSP cannot provide a transparent channel to an ISP. Therefore, in this embodiment, the demands for the packet processing capacity of the network apparatus can be decreased, and meanwhile, the IGMP packet requirements in the practical network are met.

Embodiment 6: System for Implementing Multicast

Figure 6:
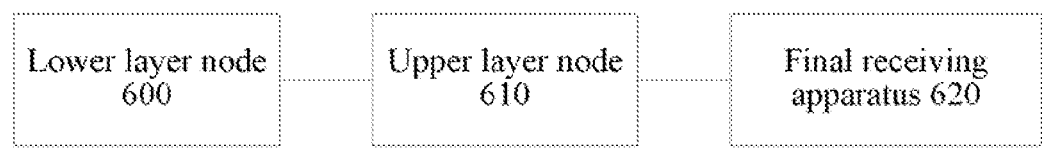
FIG. 6 is a schematic diagram of a system for implementing multicast according to Embodiment 6 of the present invention.

FIG. 6 shows this system.

The system for implementing multicast in FIG. 6 includes a first network apparatus (a lower layer node) 600, a second network apparatus (that is, an upper layer node) 610, and a final receiving apparatus 620.

In the system for implementing multicast in FIG. 6, the lower layer node 600 and the final receiving apparatus 620 are connected through at least one level of upper layer node 610. The lower layer node 600 may be located in different locations. For example, the lower layer node 600 may be located in a location of a terminal apparatus, or a location of an access apparatus above the terminal apparatus. The location of lower layer node 600 can be set according to actual requirements. The final receiving apparatus 620 is a node that needs to collect the IGMP packet in the network. FIG. 6 illustrates only one lower layer node 600 and one upper layer node 610, but the system may include a plurality of lower layer nodes 600 and a plurality of upper layer nodes 610 in practical network application. The plurality of lower layer nodes 600 may be connected to the final receiving apparatus 620 through one or more upper layer nodes 610, and one lower layer node 600 and the final receiving apparatus 620 are connected through one or more levels of upper layer nodes 610.

The lower layer node 600 is configured to: receive an IGMP packet sent by a host side or generate an IGMP packet; judge whether the IGMP packet is a first join packet or a last leave packet of a multicast group, and add an identifier indicating whether the IGMP packet is a first join packet or a last leave packet of a multicast group to the IGMP packet, that is, the lower layer node 600 distinguishes whether the IGMP packet is a first join packet or a last leave packet of a multicast group and adds an identifier indicating whether the IGMP packet is a first join packet or a last leave packet of a multicast group. Afterward, the lower layer node 600 forwards the IGMP packet to the downstream upper layer node 610.

The upper layer node 610 is configured to: receive the IGMP packet sent by the lower layer node 600 or the upstream upper layer node 610; when determining that the IGMP packet is the first join packet or the last leave packet of the multicast group according to the distinguishing identifier in the IGMP packet, perform multicast processing on the IGMP packet, and forward the IGMP packet to the downstream node; when determining that the IGMP packet is not the first join packet or the last leave packet of the multicast group according to the distinguishing identifier in the IGMP packet, perform no multicast processing on the IGMP packet, and directly forward the IGMP packet to the downstream node. The downstream node is the downstream upper layer node 610 or the final receiving apparatus 620.

The final receiving apparatus 620 is configured to receive and store the IGMP packet sent by the last level of the upstream upper layer node 610. The last level of upstream upper layer node 610 in the system may remove the distinguishing identifier in the IGMP packet forwarded to the final receiving apparatus 620 when the final receiving apparatus 620 is intended to receive the IGMP packet including no distinguishing identifier. Further, a device dedicated to removing the distinguishing identifier in the IGMP packet may also be disposed before the final receiving apparatus 620. In this way, the IGMP packet forwarded by the upper layer node 610 to the final receiving apparatus is transmitted to the device first, and the device removes the distinguishing identifier and then forwards the IGMP packet exclusive of the distinguishing identifier to the final receiving apparatus 620.

It can be known from Embodiment 6 that, in Embodiment 6, the lower layer node 600 distinguishes whether the IGMP packet is the first join packet or the last leave packet of the multicast group and adds the identifier indicating whether the IGMP packet is the first join packet or the last leave packet of the multicast group, so that the upper layer node 610 can know whether it is required to perform multicast processing on the IGMP packet, avoiding a phenomenon that the upper layer node 610 performs multicast processing on all IGMP packets, and relieving the packet processing pressure on the upper layer node 610; the upper layer node 610 forwards the IGMP packet, so that the final receiving apparatus 620 can receive and store the IGMP packet in the network, avoiding phenomenon that statistics collection and analysis for a global user cannot be performed for an on-demand operation of the user equipment and an NSP cannot provide a transparent channel to an ISP. Therefore, in this embodiment, the demands for the packet processing capacity of the network apparatus can be decreased, and meanwhile, the IGMP packet requirements in the practical network are met.

Figure 6A:
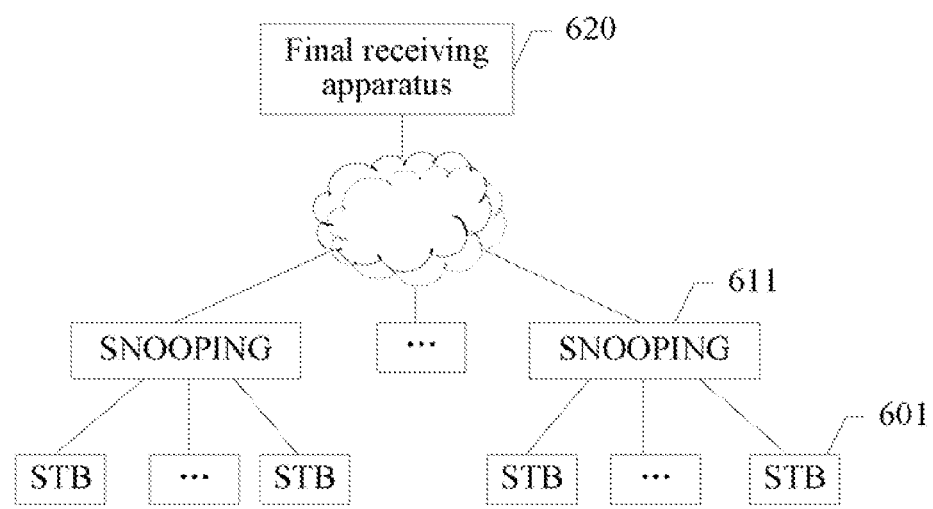
FIG. 6A is a schematic diagram of a specific system for implementing multicast according to Embodiment 6 of the present invention.

In the case that this embodiment is applied to a system having a SNOOPING function, an instance of the system for implementing multicast according to Embodiment 6 of the present invention is shown in FIG. 6A.

In FIG. 6A, the system includes: a plurality of STBs 601, a plurality of SNOOPING apparatuses 611, and a final receiving apparatus 620. The STB 601 may correspond to the lower layer node 600, and the SNOOPING apparatus 611 may correspond to the upper layer node 610.

The STB 601 generates an IGMP packet, and distinguishes the IGMP packet and adds an identifier to the IGMP packet. For example, The STB 601 adds a special packet feature identifier to the IGMP packet when the IGMP packet is the first join packet or the last leave packet of a multicast group. Afterward, the STB 601 forwards the IGMP packet to the downstream SNOOPING apparatus 611 connected thereto.

The SNOOPING apparatus 611 receives the IGMP packet sent by the STB 601; when determining that the IGMP packet is the first join packet or the last leave packet of the multicast group according to the distinguishing identifier in the IGMP packet, performs multicast processing on the IGMP packet, and forwards the IGMP packet to the downstream SNOOPING apparatus 611; when determining that the IGMP packet is not the first join packet or the last leave packet of the multicast group according to the distinguishing identifier in the IGMP packet, performs no multicast processing on the IGMP packet, and directly forward the IGMP packet to the downstream SNOOPING apparatus 611.

The final receiving apparatus 620 is configured to receive and store the IGMP packet sent by the last level of the SNOOPING apparatus 611. The last level of upstream SNOOPING apparatus 611 in the system may remove the distinguishing identifier in the IGMP packet forwarded to the final receiving apparatus 620 when the final receiving apparatus 620 is intended to receive the IGMP packet including no distinguishing identifier.

Through the above description of the embodiments, persons skilled in the art can be clearly aware that the present invention may be accomplished by software plus necessary universal hardware, and definitely may also be accomplished by hardware, but in most cases, the present invention is preferably implemented through software plus necessary universal hardware. Therefore, all or part of the contributions made by the technical solution of the present invention to the prior art may be embodied in a software product capable of executing the foregoing method procedure. The software product may be stored in storage media such as a ROM/RAM, a magnetic disk, or an optical disc, and incorporates several instructions for instructing a computer apparatus (for example, a personal computer, a server, or a network apparatus) to execute the method specified in any embodiment of the present invention or part of the embodiment.

Although the invention has been described through several preferred embodiments, persons skilled in the art is aware that modifications and variations made to the invention without departing from the spirit and scope of the invention shall be covered by the claims of the present invention.

What is claimed is:

1. A method for implementing multicast, comprising:
generating, by a user equipment, a plurality of internet group management protocol (IGMP) packets, wherein the plurality of IGMP packets are IGMP join packets of one multicast group or IGMP leave packets of one multicast group and wherein the plurality of IGMP packets comprise a first IGMP packet that is generated earlier than other IGMP packets of the plurality of IGMP packets;
adding, by the user equipment, an identifier to only the first IGMP packet of the plurality of IGMP packets, wherein the identifier indicates that the first IGMP packet is the only IGMP packet that is needed to be processed by a next network apparatus receiving the plurality of IGMP packets; and
sending, by the user equipment, the first IGMP packet and the other IGMP packets of the plurality of IGMP packets to the next network apparatus, wherein the first packet is an Multicast Listener Discovery Proxy (MLD) version 1 or a Report packet, indicative of joining a group, in an MLD version 2.

2. The method according to claim 1, wherein the identifier is included in a type filed of an Ethernet encapsulation header of the first IGMP packet.

3. A device for implementing multicast, comprising:
a processor coupled to memory, the processor programmed to receive or generate a plurality of internet group management protocol (IGMP) packets that include IGMP join packets of one multicast group or IGMP leave packets of one multicast group, wherein the plurality of IGMP join packets comprise a first IGMP packet that is generated earlier than other IGMP packets of the plurality of IGMP packets, the processor further programmed to add an identifier to only the first IGMP packet and to cause the first IGMP packet and the other IGMP packets of the plurality of IGMP packets to be sent to a next network apparatus, wherein the identifier indicates that the first IGMP packet is the only IGMP packet that is needed to be processed by the next network apparatus, wherein the first packet is an Multicast Listener Discovery Proxy (MLD) version 1 or a Report packet, indicative of joining a group, in an MLD version 2.

4. The device according to claim 3, wherein the processor is further programmed to add a non-special packet feature to each of the IGMP packets except the first IGMP packet.

5. The device according to claim 3, wherein the identifier added in the first IGMP packet is included in a type filed of an Ethernet encapsulation header of the first IGMP packet.

6. The device according to claim 3, wherein the device is a Set Top Box (STB), a Modem or home Gateway.

7. An access apparatus, comprising a processor coupled to memory, the processor configured to receive a plurality of internet group management protocol (IGMP) packets generated by a user equipment, wherein the plurality of IGMP packets are IGMP join packets of one multicast group or IGMP leave packets of one multicast group, the process programmed to identify a first IGMP packet among the plurality of IGMP packets by an identifier in the first IGMP packet, wherein the identifier indicates that the first IGMP packet is the only IGMP packet that needed to be processed among the plurality of IGMP packets, and the processor further programmed to perform multicast processing on the first IGMP packet and perform no multicast processing on the rest of the plurality of IGMP packets, wherein the first IGMP packet is an Multicast Listener Discovery Proxy (MLD) version 1 or a Report packet, indicative of joining a group, in an MLD version 2.

8. The access apparatus according to claim 7, wherein the identifier is included in a type filed of an Ethernet encapsulation header of the first IGMP packet or in an option field of the first IGMP packet to make the first IGMP packet distinct from the rest of the plurality of IGMP packets.

9. The access apparatus according to claim 7, wherein the access apparatus is a Digital Subscriber Line Access Multiplexer (DSLAM) or an Optical Line Terminal (OLT).

10. The method according to claim 1, wherein the identifier is included in an option field of the first IGMP packet.

11. The method according to claim 1, wherein the first packet is an Multicast Listener Discovery Proxy (MLD) version 1.

12. The method according to claim 1, wherein the first-packet is a Report packet, indicative of joining a group, in an MLD version 2.

13. The device according to claim 3, wherein the identifier added in the first IGMP packet is included in an option field of the first IGMP packet.

14. The device according to claim 3, wherein the first IGMP packet is an Multicast Listener Discovery Proxy (MLD) version 1.

15. The device according to claim 3, wherein the first IGMP packet is a Report packet, indicative of joining a group, in an MLD version 2.

16. The access apparatus according to claim 7, wherein the first IGMP packet is an Multicast Listener Discovery Proxy (MLD) version 1.

17. The access apparatus according to claim 7, wherein the first IGMP packet is a Report packet, indicative of joining a group, in an MLD version 2.

* * * * *